(12) United States Patent
Lahti et al.

(10) Patent No.: US 12,275,572 B2
(45) Date of Patent: Apr. 15, 2025

(54) OVENABLE TRAY COMPOSITE AND PACKAGE

(71) Applicant: AMCOR FLEXIBLES NORTH AMERICA, INC., Neenah, WI (US)

(72) Inventors: Hanna-Mari Lahti, Lempäälä (FI); Kalle Ilmari Nättinen, Tempere (FI); Andrew J. Lischefski, Appleton, WI (US)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 185 days.

(21) Appl. No.: 18/016,518

(22) PCT Filed: Jul. 22, 2020

(86) PCT No.: PCT/US2020/043106
§ 371 (c)(1),
(2) Date: Jan. 17, 2023

(87) PCT Pub. No.: WO2022/019905
PCT Pub. Date: Jan. 27, 2022

(65) Prior Publication Data
US 2023/0271767 A1 Aug. 31, 2023

(51) Int. Cl.
| | | |
|---|---|---|
| *B65D 1/34* | (2006.01) | |
| *B32B 1/00* | (2006.01) | |
| *B32B 7/06* | (2019.01) | |
| *B32B 27/08* | (2006.01) | |
| *B32B 27/10* | (2006.01) | |
| *B32B 27/30* | (2006.01) | |

(Continued)

(52) U.S. Cl.
CPC .............. *B65D 81/343* (2013.01); *B32B 1/00* (2013.01); *B32B 7/06* (2013.01); *B32B 27/08* (2013.01); *B32B 27/10* (2013.01); *B32B 27/306* (2013.01); *B32B 27/32* (2013.01); *B32B 27/36* (2013.01); *B65D 1/34* (2013.01); *B65D 65/40* (2013.01); *B32B 2255/12* (2013.01);

(Continued)

(58) Field of Classification Search
None
See application file for complete search history.

(56) References Cited

U.S. PATENT DOCUMENTS

| | | |
|---|---|---|
| 4,455,184 A | 6/1984 | Thompson |
| 4,757,940 A | 7/1988 | Quick et al. |

(Continued)

FOREIGN PATENT DOCUMENTS

| | | | |
|---|---|---|---|
| DE | 102018123453 A1 * | 3/2020 | ............... B32B 1/00 |
| EP | 2300213 B1 | 7/2012 | |

(Continued)

OTHER PUBLICATIONS

PCT International Search Report, International Application No. PCT/US2020/043106, issued Nov. 20, 2020, 2 pages.

*Primary Examiner* — Nathan J Newhouse
*Assistant Examiner* — Phillip D Schmidt

(57) ABSTRACT

An ovenable tray composite that includes a polymeric based liner and a fiber based component. The liner has an exterior surface layer and an interior surface layer comprising a polypropylene. The polypropylene has a Melt Index of about 0.2 grams/10 minutes to about 2 grams/10 minutes. The interior surface layer of the polymeric based liner is removably affixed to the interior surface of the fiber based component, and where the polymeric based liner and the fiber based component are manually separable.

10 Claims, 6 Drawing Sheets

FIG. 14

(51) Int. Cl.
*B32B 27/32* (2006.01)
*B32B 27/36* (2006.01)
*B65D 65/40* (2006.01)
*B65D 81/34* (2006.01)

(52) U.S. Cl.
CPC ....... *B32B 2255/20* (2013.01); *B32B 2255/26* (2013.01); *B32B 2307/306* (2013.01); *B32B 2307/702* (2013.01); *B32B 2307/748* (2013.01); *B32B 2439/02* (2013.01); *B32B 2439/70* (2013.01); *B65D 2565/385* (2013.01)

(56) References Cited

U.S. PATENT DOCUMENTS

| | | |
|---|---|---|
| 4,821,884 A | 4/1989 | Griffin et al. |
| 6,974,612 B1 | 12/2005 | Frisk et al. |
| 2007/0259142 A1* | 11/2007 | Lischefski .............. B32B 27/08 428/35.7 |
| 2009/0297741 A1 | 12/2009 | Oshita et al. |
| 2011/0174676 A1* | 7/2011 | Stockhaus ................ D21J 3/00 427/317 |
| 2015/0136764 A1 | 5/2015 | Dropsy et al. |

FOREIGN PATENT DOCUMENTS

| | | | | |
|---|---|---|---|---|
| EP | 2641839 A2 * | 9/2013 | ............ | B32B 27/08 |
| JP | 2002347158 A * | 12/2002 | | |
| WO | 9832603 A1 | 7/1998 | | |
| WO | 2015009518 A1 | 1/2015 | | |
| WO | 2019094057 A1 | 5/2019 | | |
| WO | 2020139343 A1 | 7/2020 | | |
| WO | WO-2020139342 A1 * | 7/2020 | ............ | B32B 27/08 |

\* cited by examiner

OVENABLE TRAY COMPOSITE AND PACKAGE

TECHNICAL FIELD

This application is related to packaging suitable to hold a product component at one time and then aid in separation of the packaging parts for more environmentally friendly disposal after use of the product. Specifically, the packaging can be designed for food storage and oven cooking without compromising its integrity during use and separation for disposability post use.

BACKGROUND

Fiber based trays with polymeric based liners have been used for many applications. These applications include packaging for various items, including industrial or consumer good products and food products. A fiber based component of the tray has advantages of low cost, low weight, recyclability, thermal insulation, tangible haptics and high stiffness. The polymer based liner is added to enhance the physical properties of the tray, including sealing properties, moisture resistance, gas barrier, grease and flavor resistance and durability.

Often, the fiber based component is coated with a thin layer of polyethylene to achieve the benefits of a polymeric liner. However, more functionality can be obtained by using a premade polymeric liner and adhering it to the fiber based component. Premade liners, primarily made of polymers, are used in some applications where the fiber based component and the polymeric liner might be separated for disposal. However, often manual separation can be difficult or results in too much of the fiber based component remaining adhered to the premade liner after separation of the two components.

Fiber based trays that are designed for ovenable applications have used liners made of high temperature resistant polymers. Liners made of high temperature resistant polymers can be difficult to adhere to the fiber based component and require an additional adhesive component between the fiber based component and the liner. Additionally, the high temperature resistant polymeric liners can be even more difficult to remove from the fiber based component once they are adhered because of the added adherence caused by the heat.

SUMMARY

There is a need for a polymeric based liner for a fiber based tray that 1) can be removably affixed to a fiber based component of the tray components, 2) can survive oven temperatures and conditions without separating prematurely from the fiber based component nor adhering too much, and 3) can be relatively easily manually separated from the fiber based component, especially after being subject to oven temperatures, for disposal of the parts separately.

The present application describes an ovenable tray composite that includes a polymeric based liner and a fiber based component. The liner includes an exterior surface layer and an interior surface layer. The interior surface layer is a polypropylene. The polypropylene has a Melt Index of about 0.2 grams/10 minutes to about 2 grams/10 minutes. The interior surface layer of the polymeric based liner is removably affixed to the fiber based component, and the polymeric based liner and the fiber based component are manually separable.

One embodiment of the ovenable tray composite includes a polymeric based liner. The liner includes an exterior surface layer of a polyester and an interior surface layer of a polypropylene. The polypropylene has a Melt Index of about 1.2 grams/10 minutes to about 1.8 grams/10 minutes. There is a first inner layer located between the exterior surface layer and the interior surface layer, and such inner layer may be a barrier layer. The ovenable tray composite also includes a fiber based component, and the interior surface layer of the polymeric based liner is removably affixed to the fiber based component.

Another embodiment of the tray composite may include a package. The package includes the ovenable tray composite described previously, a lid and a food product. The food product is hermetically sealed between the lid and the exterior surface layer of the polymeric based liner.

Any of the embodiments of the ovenable tray composite may include various materials or layers of specific polymeric film or polymeric material, e.g., polyester, polypropylene, modified polyethylene or barrier polymer, and in particular layer/material configurations, to achieve certain desired performance characteristics for the tray composite.

Any of the embodiments of the ovenable tray composite may include at least the polypropylene of the interior surface layer being substantially free of any electronic beam treatment or the entire polymeric based liner being substantially free of any electronic beam treatment.

Any of the embodiments of the tray composite may enable: a force to separate the polymeric based liner and the fiber based component to be at least 30 N/m and no more than 450 N/m; the polymeric based liner and the fiber based component to be manually separable such that when separated 3% or less of a weight of the fiber based component remains affixed to the interior surface layer; after exposure to 200° C. oven conditions for 30 minutes, the polymeric based liner remains removably affixed to the fiber based component over at least 80% of the surface area that the polymeric based liner and the fiber based component were removably affixed prior to oven exposure; and/or, the interior surface layer of the polymeric based liner is removably affixed to the fiber based component across at least 80% of a surface area where the interior surface layer is adjacent to the fiber based component.

BRIEF DESCRIPTION OF THE DRAWINGS

The disclosure may be more completely understood in consideration of the following detailed description of various embodiments of the disclosure in connection with the accompanying drawings, in which.

Figure 1:
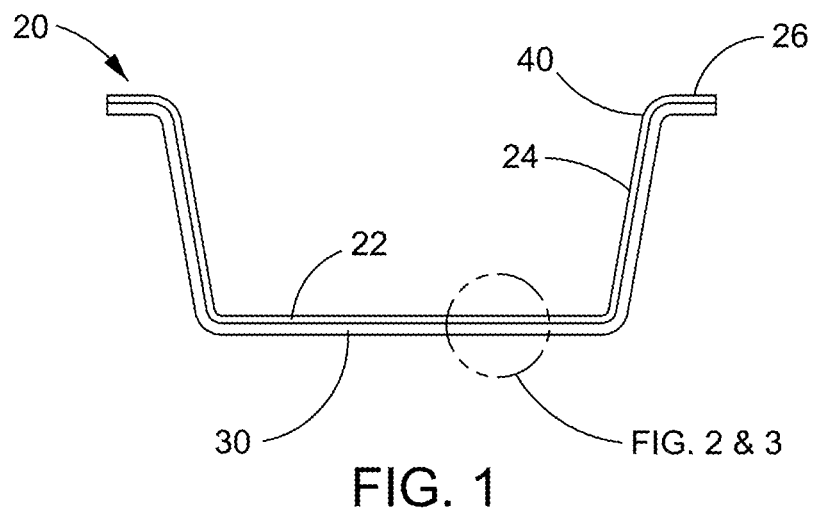
FIG. 1 is a cross-sectional view of an embodiment of an ovenable tray composite.

The drawings show some but not all features and embodiments. The elements depicted in the drawings are illustrative and not necessarily to scale, and the same (or similar) reference numbers denote the same (or similar) features throughout the drawings.

DETAILED DESCRIPTION

In accordance with the practice of at least one embodiment of the present invention, as seen in FIGS. 4-7, a package 10 includes an ovenable tray composite 20, a lid 12 and a food product 16. The product can be hermetically sealed within the package at least at seal 14. The product can be packaged and distributed for institutional use, catering or retail sale, through room temperature, refrigerated or frozen conditions, and ultimately designed to be able to withstand heating in an oven for either cooking or reheating the product packaged therein. After use, the tray composite parts can be manually separated for desired recycling and/or disposal.

As used herein, the term "layer" refers to a thickness of a material or blend of materials that may be continuous or discontinuous. As used herein, the phrase "surface layer" as applied to film layers of the present disclosure refers to any film layer having less than two of its principal surfaces directly adhered to another layer of the film. In contrast, the phrase "inner layer," as applied to film layers, refers to any film layer having both its principal surfaces directly adhered to another layer of film. The polymeric based liner can be produced using traditional film processing techniques such as blown film, cast film, or lamination. As used herein, the term "exterior surface" refers to a surface of the tray composite (such as the fiber based tray component or the polymeric based liner) that does not have contact with another tray component. Likewise, the "exterior surface layer" refers to the layer of the polymeric based liner that does not have contact with another tray component. The exterior surface layer of the polymeric based liner may have contact with other package components, such as the lid. As used herein, the term "interior surface" refers to a surface of the ovenable tray composite that is in contact with another tray component (such as the surfaces of the fiber based component and the polymeric based liner that are connected to each other). Likewise, the "interior surface layer" refers to the layer of the polymeric based liner that is in contact with another tray component, such as the fiber based component. As used herein, "connected" or "directly connected" means that the components are attached to each other and would require a force to separate them. As used herein, "adjacent" or "directly adjacent" means that there is no intervening material between the components. As used herein, the terms "adhere" and formatives thereof as applied to film layers or other components of the present invention, are defined as affixing of the subject layer surface to another surface.

Figure 2:
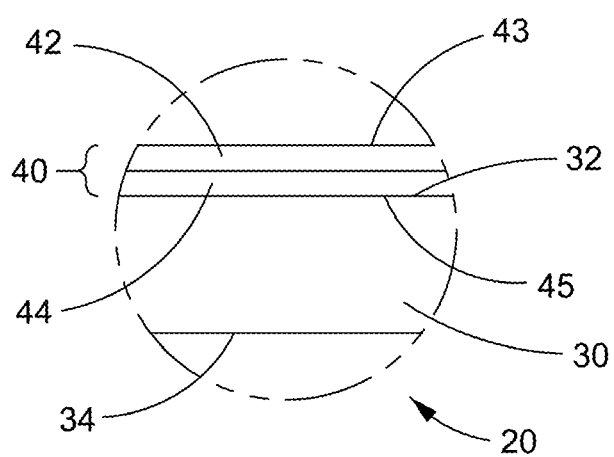
FIG. 2 is an exploded view of a portion of that seen in FIG. 1, as noted.

An embodiment of the ovenable tray composite 20 described herein is shown in FIGS. 1-2. The tray composite 20 includes a polymeric based liner 40, the liner including an exterior surface layer 42, having an exterior surface 43, and an interior surface layer 44. A fiber based component 30, having an exterior surface 34, is removably affixed at its interior surface 32 to the interior surface layer 44 of the polymeric based liner 40, where the polymeric based liner and the fiber based component are manually separable, and preferably separable after they have been removably affixed together. The interior surface layer 44 is a polypropylene and the polypropylene has a Melt Index of about 0.2 grams/10 minutes to about 2 grams/10 minutes. It is the inventors' unexpected discovery and innovative development to use a polypropylene as taught here that significantly enhances the polymeric based liner 40 and the fiber based component 30 being manually separable (peeled apart by hand) after they have been removably affixed together, better than possible without such a polypropylene, but while also not negatively impacting the adhesion of the polymeric based liner 40 and the fiber based component 30 for use of the package and until disposal is desired. For example, this is due at least in part to the polymer flow of the polymeric based liner to the fiber based component under oven conditions being successfully restricted during oven temperatures by the melt viscosity of the polypropylene interior surface layer, i.e., such that the polypropylene material itself in layer 44, as well as the polypropylene layer 44 as a whole (e.g., when this layer comprises other material also), has the disclosed Melt Index.

That is, one challenge the present invention addresses with tray composite 20 is ensuring enough adhesion between the polymeric based liner and the fiber based component so they act as one during use. Use includes both construction and assembly of the tray composite, e.g., converting (winding, unwinding, slitting, (thermo)forming, sealing, and all steps of packaging a product), locating the product or food product against the polymeric based liner, e.g., with or without a lid, and through to removal of the product or food product from location against the polymeric based liner. Thereafter the innovative features of the ovenable tray composite better enable eventual disposal of the tray composite into its separated components as desired. For example, preferably this means the interior surface layer 44 is removably affixed to the interior surface 32 across at least 80% of a surface area where the interior surface layer 44 is adjacent to the fiber based component 30. And, even more preferably, the interior surface layer is removably affixed to the fiber based component across at least 85%, 90%, 95%, 98% or substantially all of the surface area where the interior surface layer 44 is adjacent to the fiber based component 30.

Opposite the challenge to insure enough adhesion and dimensional stability in use, is the challenge to enable manual separation of the polymeric based liner 40 and the fiber based component 30 once the product has been used or consumed and now the tray composite needs to be disposed of properly. Because these challenges oppose one another, enhancing one is at the detriment of the other, until discovery and development of the subject invention. Thus, there must be a balance between enough adhesion during use of the tray composite and not so much adhesion that the tray composite cannot be manually separated into its parts for disposal in a desirable way, e.g., an environmentally friendly way that enables recyclability per local regulations for doing so.

Further in this regard, preferably the polypropylene of interior surface layer 44 has a Melt Index of about 1 gram/10 minutes to about 1.8 grams/10 minutes. More preferably, interior surface layer 44 has a Melt Index of about 1.2 grams/10 minutes to about 1.8 grams/10 minutes, and even more preferably, in steps of increasing preference, interior surface layer 44 has a Melt Index of about 1.4 grams/10 minutes to about 1.6 grams/10 minutes, and a Melt Index of about 1.5 grams/10 minutes. For example, in one embodiment of the invention, the polypropylene for interior layer 44 is commercially available Borclear™ RB 707CF of Borealis AG in Vienna, Austria, can provide the desired Melt Index. Further, preferably such a polypropylene material can be present in layer 44 in an amount of at least 94%, more preferably at least 96%, even more preferably about 98%, and where the balance of the material present in the layer can be conventional sealant additives for processing or other physical property controls such as slip or anti-block agents, as one or ordinary skill in the art would know to do in combination with the teachings here. As used herein, the Melt Index is measured using ASTM D-1238-10 (Standard Test Method for Melt Flow Rates of Thermoplastics by Extrusion Plastometer), which is incorporated herein by reference in its entirety. In particular, the Melt Index is called the melt flow rate determined according to Procedure A in ASTM D-1238-10 and measured at 230 degrees Celsius and under a 2.16 Kg weight.

In another embodiment, at least the polypropylene of the interior surface layer is substantially free of any electronic beam treatment, and preferably the polymeric based liner (as a whole) is substantially free of any electronic beam treatment. Without being limited to a theory of understanding, the inventors have found that while often there is benefit gained from electronic beam treatment used to induce crosslinking within one or more of the polymer layers of the liner, for this embodiment the treatment and/or crosslinking is not necessary. Rather, the adhesion property is better controlled using the innovative polypropylene layer as taught herein. That is, using irradiation like an electron beam generator often induces crosslinking and this generally enhances the liner properties to help better survive the conditions of oven cooking. However, in the embodiment noted here, other liner layers can be utilized to attain the needed ovenable properties, as further described herein.

For understanding as used herein, the term "crosslinking" refers to the chemical reaction which results in the formation of bonds between polymer chains, such as, but not limited to, carbon-carbon bonds. Crosslinking may be accomplished by use of a chemical agent or combination thereof which may include, but is not limited to, for example, peroxide, silanes and the like. One method for determining the degree of crosslinking is to measure the "gel content." As used herein, the term "gel content" refers to the relative extent of crosslinking within a polymeric material. Gel content is expressed as a relative percent (by weight) of the polymer having formed insoluble carbon-carbon bonds between polymers and may be determined by ASTM D-2765-01 Test Method, which is incorporated herein by reference in its entirety.

Further in regard to the proper balance between adhesion during use of the package and separability for disposal, another embodiment of the invention can be practiced so the polymeric based liner 40 and the fiber based component 30 are manually separable such that when separated 5%, 4%, 3% or less of a weight of the fiber based component remains affixed to the interior surface layer of the polymeric based liner. Even more preferred, the polymeric based liner and the fiber based component can be manually separable such that when separated 2% or 1% or less of a weight of the fiber based component remains affixed to the interior surface layer. Similar to this, and still more preferred, when the fiber based component is manually separated from the interior surface layer, the present invention now enables the user to substantially maintain and substantially uncompromise the structural integrity of the interior surface layer. That is, the act of manually separating will, desirably, not materially damage or degrade the interior surface layer of the polymeric based liner. Likewise, the interior surface of the fiber based component is not significantly damaged.

Still further concerning the proper balance between adhesion during use and separability for disposal, a force to separate the polymeric based liner 40 and the fiber based component 30 for disposal is at least 10 N/m and no more than 500 N/m. Yet more preferred, the force to separate the polymeric based liner and the fiber based component is at least 30 N/m, 50 N/m, 80 N/m or 100 N/m and no more than 300 N/m, 350 N/m, 400 N/m or 450 N/m. The separation of the liner 40 from the fiber based component 30 is measured using tensile testing equipment according to ASTM F904. In particular, all aspects of the F904 test procedure should be employed as stated in F904 to make the measurements needed to determine the force to separate the identified parts of the tray composite after the package is subject to its intended use, except as follows: Section 8.3 test five specimens from the tray composite in its longitudinal direction and test five specimens from the tray composite made in its width direction (i.e., perpendicular to the longitudinal) with each set of five being its own force measurement contemplated by the invention here (and in the event the tray composite is square then picking one length or width direction as the longitudinal direction and the width direction as perpendicular to that), Section 10.1.1 condition for 40 hours, Section 11.1 only use mechanical means to start separation of the fiber based component from the polymeric based liner, Section 11.3.1 is used and not 11.3.2 nor 11.3.3, Section 12.1 is used and not 12.2.

Figure 3:
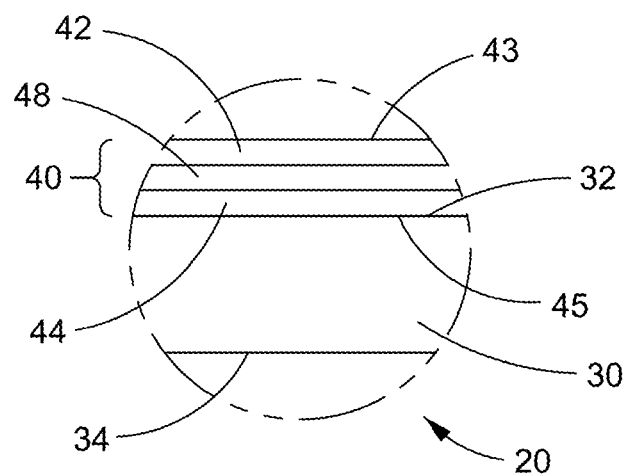
FIG. 3 is an exploded view of a portion of that seen in FIG. 1, as noted, but showing an alternative embodiment of the ovenable tray composite.

In another embodiment of the present invention, seen in FIG. 3, the polymeric based liner 40 further comprises at least one inner layer 48 located between the exterior surface layer 42 and the interior surface layer 44. The polymeric based liner 40 optionally contains any number of inner layers that may include polymers for functionality such as, but not limited to, interlayer adhesion (such as modified polyethylene tie layers), barrier (reducing transmission of oxygen, moisture or other chemical species), or structural enhancement (enhancing thermoformability, puncture strength, etc.). The polymeric based liner can have a thickness from about 25 µm to 500 µm, or from about 50 µm to 300 µm.

One or more of the optional inner layers of the liner could comprise a barrier polymer such as EVOH. Barrier polymers or barrier materials are generally known to reduce the transmission of a gas or water vapor through the film. These materials may be required for some applications to preserve the packaged food product through distribution. For instance, in some cases moisture barrier is required to prevent a product from drying out (losing moisture content). In other cases, oxygen barrier is required to prevent ingress oxygen from degrading a product prematurely. Barrier materials are generally known in the industry and are typically used to preserve the quality of a product and extend the shelf life of the packaged product. Barrier materials are typically used for oxygen sensitive food products packaged in any number of ways including vacuum skin packaging (VSP) and modified atmosphere packaging (MAP).

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula: $[(CH2-CH2)_n—(CH2-CH(OH))_m]$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene.

The exterior surface layer of the polymeric based liner can be a polyester. As used throughout this application, the term "polyester" or "PET" refers to a homopolymer or copolymer having an ester linkage between monomer units. Polyesters may include a homopolymer or copolymer of alkyl-aromatic esters, including but not limited to polyethylene terephthalate (PET), amorphous polyethylene terephthalate (APET), polyethylene furanoate (PEF), glycol-modified polyethylene terephthalate (PETG), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA), polyglycolic acid (PGA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials. The exterior surface layer can be at least 50%, 60%, 70%, 80% or 90% polyester. Preferably, when a polyester, the exterior surface layer is comprised of at least 95% polyester. For example, in one embodiment of the invention, the polyester for exterior surface layer 42 can be commercially available cPET Triniflex® from Nitro-Chem S.A. of Bydgoszc, Poland.

Figure 8:
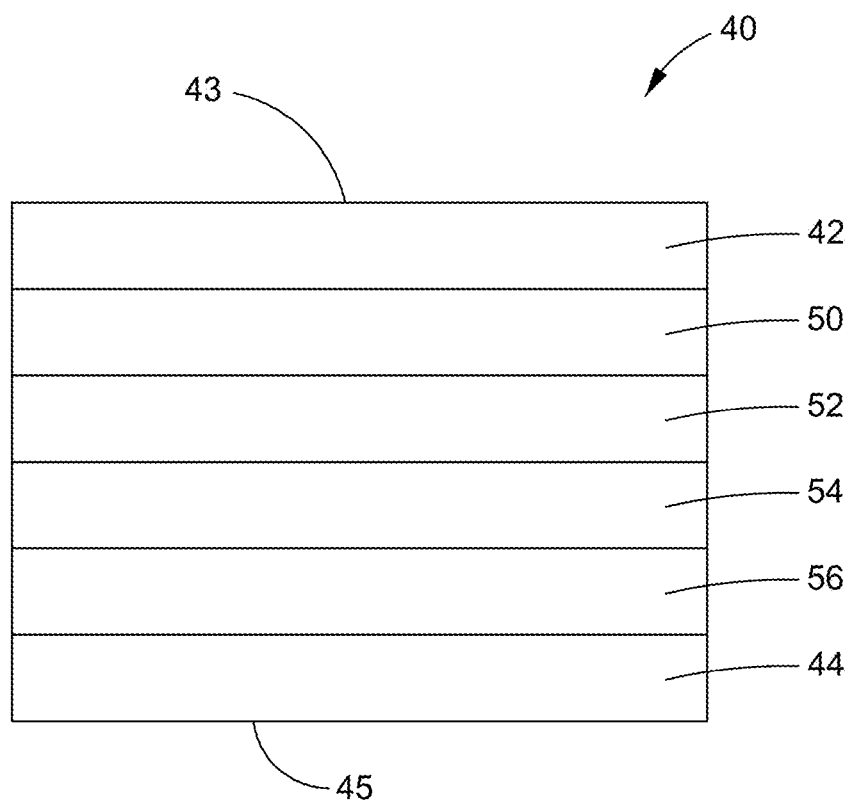
FIG. 8 is an exploded view of a portion of an ovenable tray composite like that seen in FIGS. 2 and 3, but showing an alternate embodiment of the polymeric based liner.

In one embodiment, as seen in FIG. 8, the polymeric based liner 40 has an exterior surface layer 42 comprising polyester. Next to this is a first inner layer 50 preferably comprising a first polyethylene. Then, there is a second inner layer 52, preferably comprising a first modified polyethylene. Next is a third inner layer 54, preferably comprising a barrier polymer, and more preferably ethylene vinyl alcohol copolymer. Then, there is a fourth inner layer 56, preferably a second modified polyethylene. And, finally there is the interior surface layer 44, preferably polypropylene. Alternately, the polyester may be an amorphous polyester. Still alternately, the second modified polyethylene is independent of and different from the first modified polyethylene.

In each embodiment, the tray composite is ovenable. For example, in part this can be achieved when the polymeric based liner has the liner properties noted above that enable it to better survive the conditions of oven cooking. In one way, such ovenable properties are enabled and/or enhanced when the exterior surface layer is a polyester, and more preferably an amorphous polyester, as discussed previously. Further, the fiber based component may have a coating on or in its material(s) to enhance its ovenability. Typical coatings for ovenable fiber based materials include clay or polyester. Clay pigment coatings typically contain white mineral or organic pigments, a polymeric latex binder and auxiliaries. The inks used for printing may be ovenable. Ovenable cardboard products such as PrintKote® are available from WestRock Company.

Figure 9:
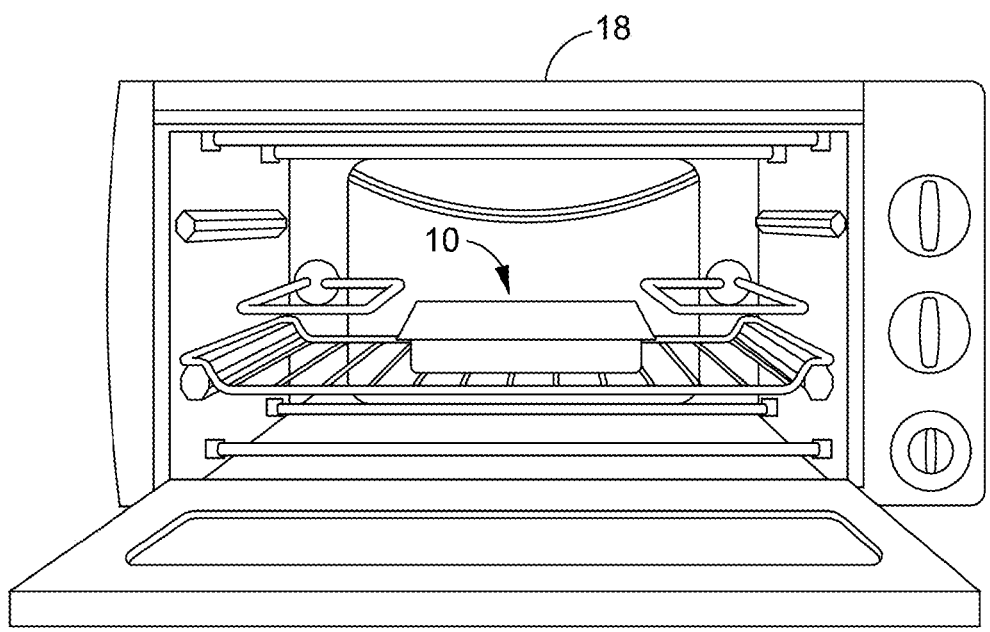
FIG. 9 is a view of an embodiment of a package in an oven before heating.

FIG. 9 shows the package 10 inside an oven 18. As used in this application, a liner is heat resistant if it resists at least some separation from the fiber based component while experiencing heat and potential mechanical stress due to pressure increase (pressure internal to a fully or partially sealed package). This can be advantageous because, after exposure up to and including 125° C., 150° C., 175° C., 200° C. and 220° C. oven conditions for 15, 30 and up to 45 minutes, the polymeric based liner remains removably affixed to the fiber based component at an adhesion level between 90% and up to 100%, 150%, 200%, 250% and even 300% of the extent in N/m that the polymeric based liner and the fiber based component were removably affixed prior to oven exposure. For example, pre-ovening it may take 50 N/m to manually separate the fiber based component from the polymeric based liner, and after ovening it may take 150 N/m to manually separate the fiber based component from the polymeric based liner but does not take more than 500 N/m or else adhering will be too extensive for quality separation. As such, this will obtain the separation taught by the invention, and preferably there will be little to no fibers remaining affixed to the separated liner and the separated liner integrity is not materially compromised. And, as compared to an ovenable tray composite without the polypropylene interior surface layer, the polypropylene interior surface layer helps lower the extent in N/m it will take to separate the fiber based component from the polymeric based liner after ovening of the tray composite. Again, all this is achieving that very difficult balance of enough adhesion but not too much adhesion. Without the present invention, the adhesion between the fiber based component and the polymeric based liner is either too little before and/or after ovening and pre-mature separation occurs, or adhesion is too much after ovening and manual separation is difficult to impossible without substantial tearing of the fiber based component. Tensile testing equipment employed according to ASTM F904, and as instructed above, is used here also to determine the average force in N/m to separate the fiber based component from the polymeric based liner before, and then after, the package is subject to the oven temperatures for the stated time. Said another way, and also preferred, the polymeric based liner remains removably affixed to the fiber based component over at least 80%, 85%, 90%, 95%, to substantially all, most preferably, of the surface area that the polymeric based liner and the fiber based component were removably affixed prior to oven exposure.

The fiber based component of the tray can be, but is not limited to, paperboard, paper or other fiber based materials. The fiber based component can be a formable paper or a paperboard blank that can be folded into a tray type configuration. The fiber based component may have a part manufactured by a molded pulp process or a part produced directly from a natural raw material like wood or bamboo. The fiber based component may be part manufactured from polymer fibers. The fiber based component may be a single layer or multiple layers. A multilayer fiber based component can be achieved by laminating paper layers. Formable papers, such as FibreForm® (available from BillerudKorsnäs®) allow stretch and formability. Typically, formable papers are available in grades with basis weight of 80, 100, 150 or 200 g/m². The fiber based component should have stiffness and rigidity suitable for the application. Cardboard based trays preferably have a basis weight above 200 g/m². Rigidity of the formable paper based component can be adjusted with the basis weight and density of the paper layer or the paper layers and the accompanying polymer based layers. The required rigidity is largely dependent on the application and the size/design of the tray.

A preferred embodiment of the polymeric based liner is produced by coextrusion. The exterior surface layer, the interior surface layer and any optional inner layers of the liner may be coextruded together (fully coextruded). Alternatively, any two or more adjacent layers could be coextruded together, and the remaining layers subsequently added in a different processing step, such as adhesive lamination, extrusion lamination, or coating.

Figure 4:
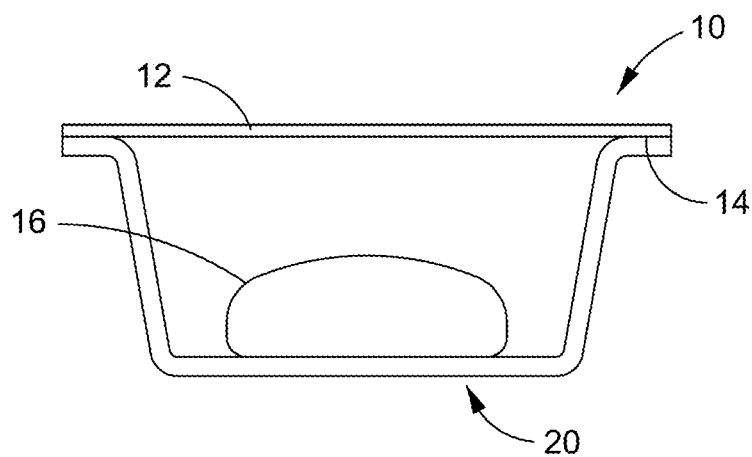
FIG. 4 is a cross-sectional view of the tray composite seen in FIG. 1, with a food product and a lid.
Figure 5:
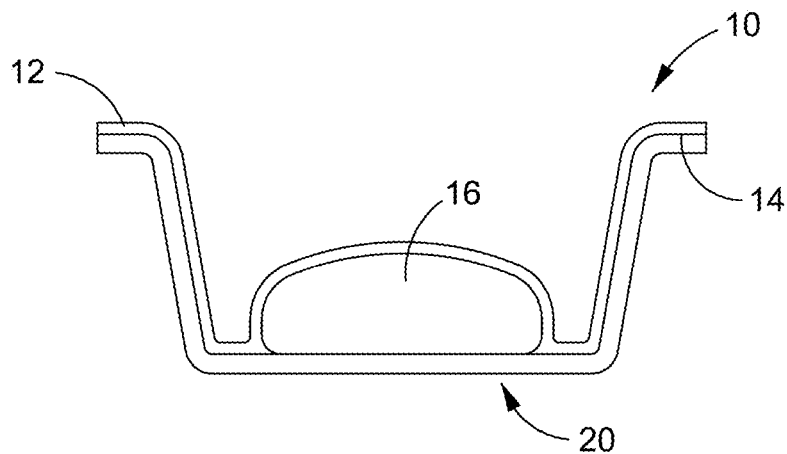
FIG. 5 is a cross-sectional view of the tray composite seen in FIG. 4, with the food product and an alternate lid embodiment.

The exterior surface layer 42 of the liner 40 can also be the layer that is connected to the lid 12 and any other components of the package 10. As shown in the embodiment of FIG. 4, the lid 12 is connected to the tray composite 20 using a hermetic seal 14 at the flange 26 (see also FIG. 1) of the tray. As shown in the embodiment of FIG. 5, the lid 12 is connected to the tray composite 20 using hermetic seal 14 along the flange 26 and portions of the sidewalls 24 (see also FIG. 1) and bottom 22 of the tray 20. The hermetic seal may be formed by any known method including heat sealing, ultrasonic sealing, RF welding, etc. The bond between the lid 12 and the tray composite 20 may be manually peelable for removal at the time of use to access the product. The material of the exterior surface 43 of the liner can be configured for appropriate bonding to the lid and other package components such that a hermetic package can be formed for enclosing the food product 16 therein.

Prior to bonding to the fiber based component, in some embodiments the interior surface 45 of the polymeric based liner may be surface treated to increase the surface energy. This can be advantageous to be better able to control the adhesion between the interior surface 45 of the polymeric based liner and interior surface 32 of fiber based component 30. As used herein, the phrase "surface treated" as applied to film layers refers to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. Surface treatment also helps enable the polymeric based liner to be connected to the fiber based component of the tray, under heated conditions, without the use of an additional adhesive material. That is, the polymeric based liner may be directly connected to the fiber based component. In other words, the polymeric based liner may be adjacent to the fiber based component. In one or more embodiments, the polymeric based liner and the fiber based component are connected together and directly adjacent to each other.

The polymeric based liner is thermally laminated to the fiber based web, aka the fiber based component. The resulting composite tray material can be subsequently formed into a tray by thermoforming, press forming or other similar techniques, thereby forming the tray composite. Sufficient heat for lamination of the polymeric based liner to the fiber based component can be applied to the relatively thin liner, meaning that the process is not dependent on the thickness of the fiber based component. The type and thickness of the fiber based component generally does not affect the speed or efficiency of the thermal lamination process. Heat can be applied to the liner in a number of ways including, but not limited to convection heating by an industrial oven or direct contact heating. Direct contact heating may provide the most controlled heating. One method of direct contact heating can be done simultaneously with the lamination by using a heated nip roller system at the point where the polymeric based liner comes in contact with the fiber based component. The heated roller of the nipping system can be in contact with the exterior surface 43 of the polymeric based liner and the backing rollers are located on the exterior surface 34 of the fiber based component. Lamination can be controlled by the heated roller temperature, line speed (dwell time) and nip pressure. A textured or banded heated nip roller may allow for spot-bonding of the polymeric based liner to the fiber based component. This may allow for the provision of a peel tab at the edge of the tray component for ease of separation.

Optionally, the fiber based component of the tray can be pre-formed into the tray or receptacle configuration and the polymeric based liner subsequently heated and formed into the tray configuration and simultaneously bonded to the fiber based component. Again, the polymeric based liner can be heated by any methods. A particularly useful method is one that mimics the VSP process used to apply lids to containers. In this case, there is no packaged item in the tray and the polymeric based liner material is heated and vacuum formed into the tray composite, simultaneously connecting to the fiber based component.

Figure 10:
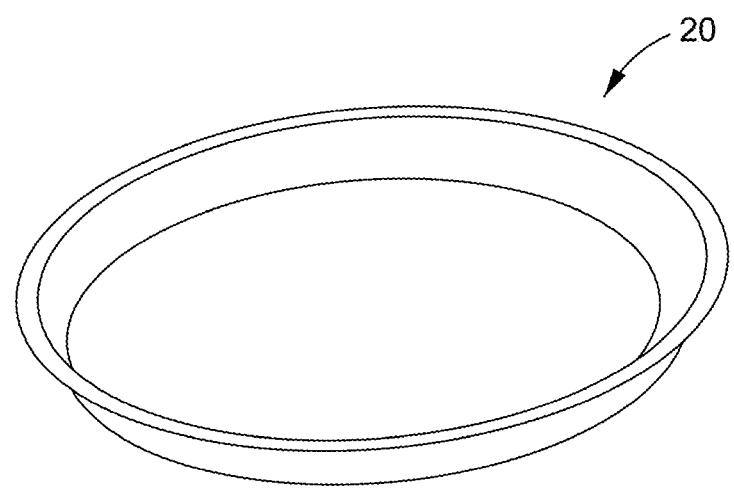
FIG. 10 is a view of another embodiment of an ovenable tray composite.
Figure 11:
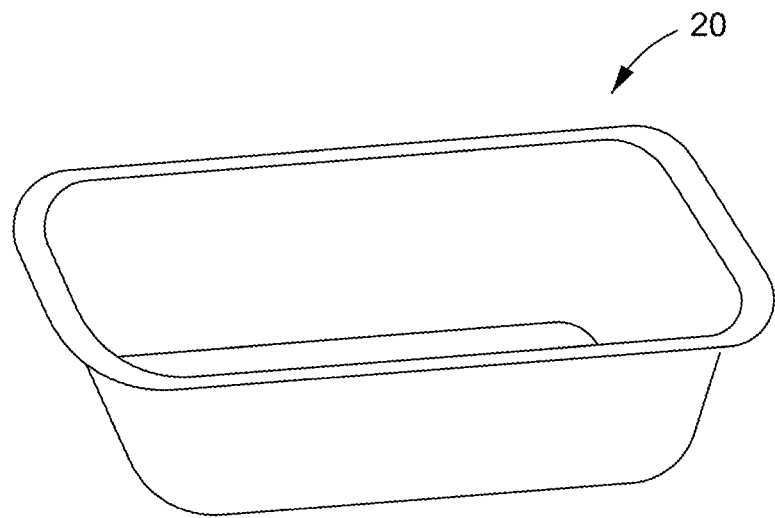
FIG. 11 is a view of yet another embodiment of an ovenable tray composite.
Figure 12:
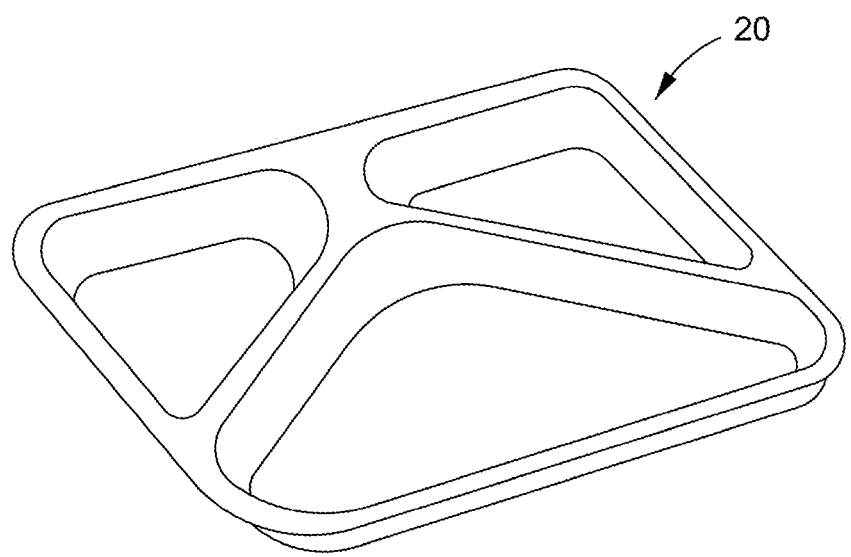
FIG. 12 is a view of still another embodiment of an ovenable tray composite.

The ovenable tray composite may be a receptacle, having a bottom, at least one sidewall and a flange as shown in FIGS. 10, 11 and 12. The tray may have more than one compartment as shown in FIG. 12. It has also been contemplated that the tray composite can be essentially a flat sheet with no formed areas, as in FIG. 7. In this case, the lid is sealed to the tray composite in the locations surrounding the packaged product.

Figure 6:
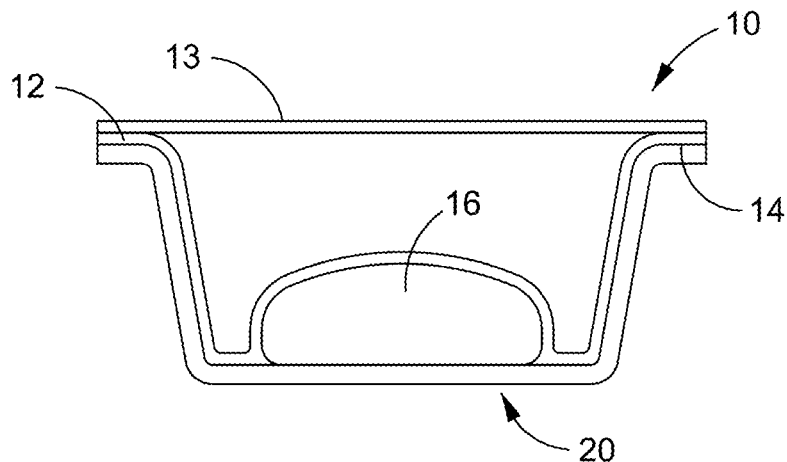
FIG. 6 is a cross-sectional view of the tray composite seen in FIG. 5, with the food product and an alternate lid embodiment.
Figure 7:
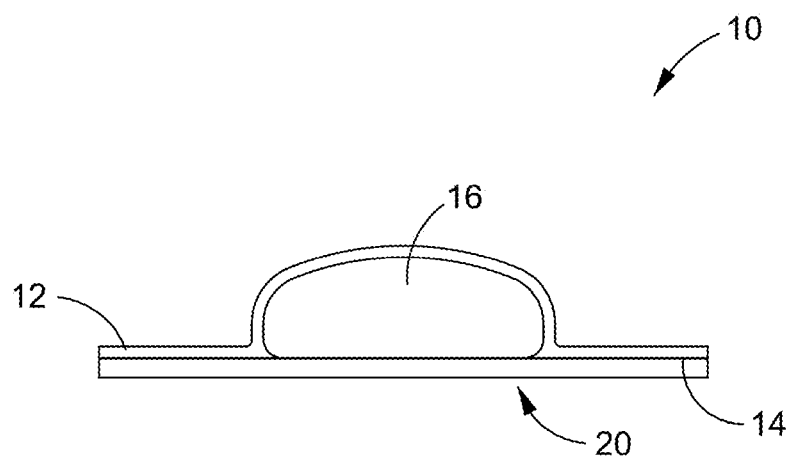
FIG. 7 is a cross-sectional view of an alternate embodiment of the tray composite seen in FIG. 1, with a food product and a lid.

The lid can be any type of lidding that can provide hermetic seals in combination with the sealing surface (i.e. the exterior surface 43) of the polymeric liner, adequate shelf life for the product prior to reheating and heat resistance up to 220° C. The seals described in this application may be formed by heat, impulse, ultrasonic, pressure or other seal-forming methods as known in the art. The lid may slightly or fully conform to the product within the package. The lid may be applied in a VSP process or any other process known to the packaging industry. Multiple lids may be applied, such as a combination of a VSP lid 12 and a flat lid 13, as shown in FIG. 6. Bond strength may be higher at the intersection of joined parts beyond when the polymeric based liner is removably affixed to the fiber based component, e.g., where the lid 12 is joined to the tray composite as in FIGS. 4-7.

The lid may be of a polymeric material, fiber based material, metal based material or combinations thereof. The lid may provide barrier, puncture resistance, or any other type of characteristic that would aid in protecting the product packaged therein. The lid may be opaque or transparent (or any gradient of transparency) and may be tinted or otherwise pigmented. The lid may have printed indicia on either side or within the layers thereof. It is further contemplated that the lid may be identical, or similar to, the tray component as described herein. This would result in a clamshell type packaging configuration.

The packages described herein can be filled with a wide variety of products. The products can be items that consumers will want to heat, reheat or cook in an oven or warming device. As used herein, the term "oven" or "ovenable" refers to the process of heating, by any means, with the intent of raising the temperature of, or cooking, the contents within the package. Typical means for heating include conventional ovens using radiant heat, convection style ovens and microwave ovens. The oven conditions described herein refer to the environment around the package (external heating) or interior to the package (heating the packaged product via microwave, for example). Prior to oven heating, the lid component of the tray can be fully removed, partially removed (venting) or remain fully connected to the tray. Intense heating cycles may cause lids that are still connected to partially or fully disconnect from the tray, this can depend on the product within.

Figure 13:
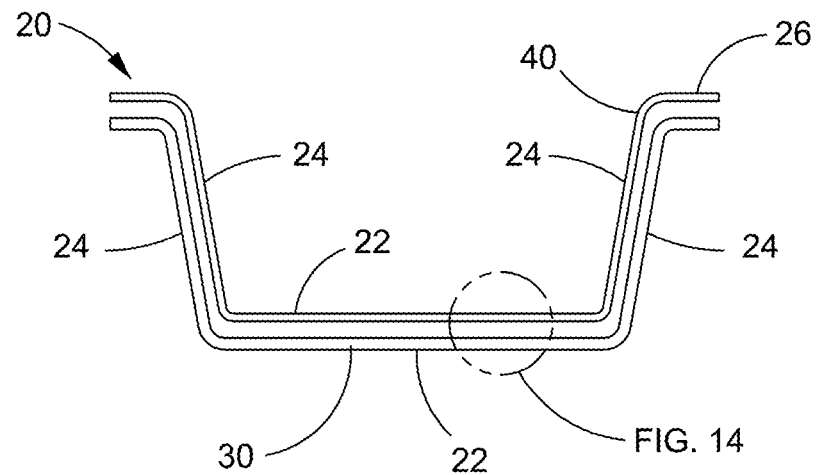
FIG. 13 is a cross-sectional view of the ovenable tray composite seen in FIG. 1, but now with the polymeric based liner separated from the fiber based component.
Figure 14:
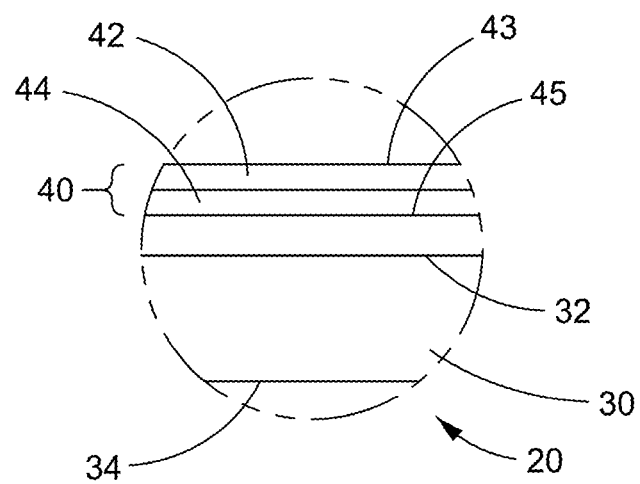
FIG. 14 is an enlarged view of a portion of that seen in FIG. 13, as noted.

In yet another embodiment of the invention, and in combination with FIGS. 13-14, is disclosed a method of using the ovenable tray composite taught herein. The method includes obtaining a polymeric based liner, the liner including an exterior surface layer and an interior surface layer, the interior surface layer being a polypropylene having a Melt Index of about 0.2 grams/10 minutes to about 2 grams/10 minutes; obtaining a fiber based component; removably affixing the interior surface layer of the polymeric based liner to an interior surface of the fiber based component; heating the ovenable tray composite; and, then manually separating the polymeric based liner and the fiber based component. Additional features of the method are claimed below and will be understood as previously taught and described above and in the drawings.

EXAMPLES

Fully coextruded polymeric based liners of the general structure of PET/polyethylene/modified polyethylene tie/ barrier polymer/modified polyethylene tie/polypropylene (shown in FIG. 8) were produced by conventional coextrusion methods. Relevant details of three different liner structures A, B, and C are provided. Each liner version used Borclear RB 707CF at about 98% Borclear for the interior layer 44, and having a Melt Index of about 1.5 grams/10 minutes. The liners had a thickness of about 100 microns. The polymeric liners (including interior surface, 45) of A, B and C were not surface treated, and for A and B they were not subjected to electron beam irradiation, but C was electron beam treated. The liner samples were heated and subsequently thermoformed and bonded to a pre-assembled fiber based tray made from an ovenable clay coated white cardboard under condition (X) 175 degrees C. to 200 degrees C. for 2.5 seconds (pressure at 4-8 bars). Oven testing was completed in fan assisted ovens under condition (Y) 180 degrees C. for 30 minutes as though a package in oven without lid, before measuring seal strength. Oven testing was completed in fan assisted ovens under condition (Z) 100 degrees C. for 30 minutes as though a package in oven with lid, before measuring seal strength. The packages were evaluated for performance both pre-ovening and after the extended periods of time simulating being in the oven with the without a lid.

All liners A, B and C had good appearance after each condition. All liners were satisfactorily adhered to the fiber based tray component pre-ovening, namely, formed nicely with adhesion and easy peeling to remove the liner without degradation of liner or cardboard. After removing the composite trays from the ovening conditions, it was found that lamination of liner A and B for each of conditions Y and Z were also as desired, namely, liner peeled away nicely from cardboard, and liner and the cardboard were intact with no delamination noticed. However, for liner C liner removal resulted in fiber tear when peeling the liner from the cardboard after conditions Y and Z. As electron beam irradiation was the relevant difference between the samples, it clearly had a negative impact on performance of the polymeric based liner.

ADDITIONAL DISCUSSION OF THE EMBODIMENTS

Embodiment 1

An ovenable tray composite that include a polymeric based liner and a fiber based component. The polymeric based liners includes an exterior surface layer and an interior surface layer comprising a polypropylene, the polypropylene having a Melt Index of about 0.2 grams/10 minutes to about 2 grams/10 minutes. The interior surface layer of the polymeric based liner is removably affixed to the fiber based component and the polymeric based liner is manually separable from the fiber based component.

Embodiment 2

The ovenable tray composite according to any prior embodiment and the polymeric based liner further comprises at least one inner layer of a barrier polymer located between the exterior surface layer and the interior surface layer.

Embodiment 3

The ovenable tray composite according to any prior embodiment and the exterior surface layer comprises a polyester.

Embodiment 4

The ovenable tray composite according to any prior embodiment and the polypropylene has a Melt Index of about 1 grams/10 minutes to about 1.8 grams/10 minutes.

Embodiment 5

The ovenable tray composite according to any prior embodiment and the polypropylene of the interior surface layer is substantially free of any electronic beam treatment.

Embodiment 6

The ovenable tray composite according to any prior embodiment and the force to separate the polymeric based liner and the fiber based component is from about 30 N/m to about 450 N/m.

Embodiment 7

The ovenable tray composite according to any prior embodiment and the fiber based component is an ovenable paperboard.

Embodiment 8

The ovenable tray composite according to any prior embodiment and
the polymeric based liner is directly adjacent to the fiber based component.

Embodiment 9

An ovenable tray composite including a polymeric based liner and a fiber based component. The polymeric based liner includes an exterior surface layer comprising a polyester and a first inner layer and an interior surface layer comprising a polypropylene, the polypropylene having a Melt Index of about 1.2 grams/10 minutes to about 1.8 grams/10 minutes and the first inner layer is located between the exterior surface layer and the interior surface layer. The interior surface layer of the polymeric based liner is removably affixed to the fiber based component.

Embodiment 10

The ovenable tray composite according to embodiment 9 and the first inner layer is a polyethylene.

Embodiment 11

The ovenable tray composite according to any of embodiments 9-10 and the polymeric based liner further includes a second inner layer comprising a first modified polyethylene and a third inner layer comprising a barrier polymer, and a fourth inner layer comprising a second modified polyethylene. These three layers are located between the first inner layer and the interior surface layer.

Embodiment 12

The ovenable tray composite according to embodiment 11 and the third inner layer comprises an ethylene vinyl alcohol copolymer.

Embodiment 13

The ovenable tray composite according to any of embodiments 9-12 and the polymeric based liner is substantially free of any electronic beam treatment.

Embodiment 14

The ovenable tray composite according to any of embodiments 9-13 and the polyester is an amorphous polyester.

Embodiment 15

The ovenable tray composite according to any of embodiments 11-14 and the second modified polyethylene is independent of and different from the first modified polyethylene.

Embodiment 16

The ovenable tray composite according to any of embodiments 9-15 and the polymeric based liner and the fiber based component are manually separable.

Embodiment 17

A package including the ovenable tray composite of any of the prior embodiments, a lid; and a food product; and where the food product is hermetically sealed between the lid and the exterior surface layer of the polymeric based liner.

Embodiment 18

The package according to embodiment 17 where after exposure to 200° C. oven conditions for 30 minutes, the polymeric based liner remains removably affixed to the fiber based component over at least 80% of the area that the polymeric based liner and the fiber based component were connected prior to oven exposure.

Embodiment 19

The package according to embodiment 18 where the at least 80% of the area still connected is to substantially the same force required to separate the polymeric based liner and the fiber based component prior to oven exposure.

Embodiment 20

The package according to any of embodiments 18-19 where the polymeric based liner and the fiber based component are manually separable such that when separated 3% or less of a weight of the fiber based component remains affixed to the interior surface layer of the polymeric based liner.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the present invention.

What is claimed is:

1. An ovenable tray composite comprising:
 a) a polymeric based liner comprising:
  i) an exterior surface layer comprising a polyester;
  ii) a first inner layer, wherein the first inner layer is a polyethylene, and,
  iii) an interior surface layer comprising a polypropylene, the polypropylene having a Melt Index of about 1.2 grams/10 minutes to about 1.8 grams/10 minutes wherein the first inner layer is located between the exterior surface layer and the interior surface layer;
  iv) a second inner layer comprising a first modified polyethylene
  v) a third inner layer comprising a barrier polymer, and
  vi) a fourth inner layer comprising a second modified polyethylene, wherein layers iv), v) and vi) are located between the first inner layer and the interior surface layer, and b) a fiber based component, wherein the interior surface layer of the polymeric based liner is removably affixed to the fiber based component.

2. The ovenable tray composite of claim 1, wherein the third inner layer comprises an ethylene vinyl alcohol copolymer.

3. The ovenable tray composite according to claim 1, wherein the polymeric based liner is substantially free of any electronic beam treatment.

4. The ovenable tray composite of claim 1, wherein the polyester is an amorphous polyester.

5. The ovenable tray composite of claim 1, wherein the second modified polyethylene is independent of and different from the first modified polyethylene.

6. The ovenable tray composite of claim 1, wherein the polymeric based liner and the fiber based component are manually separable.

7. A package comprising:
a) the ovenable tray composite of claim 1;
b) a lid; and
c) a food product;
wherein the food product is hermetically sealed between the lid and the exterior surface layer of the polymeric based liner.

8. The package according to claim 7, wherein after exposure to 200° C. oven conditions for 30 minutes, the polymeric based liner remains removably affixed to the fiber based component over at least 80% of the area that the polymeric based liner and the fiber based component were connected prior to oven exposure.

9. The package according to claim 8, wherein the at least 80% of the area still connected is to substantially the same force required to separate the polymeric based liner and the fiber based component prior to oven exposure.

10. The package according to claim 8, wherein the polymeric based liner and the fiber based component are manually separable such that when separated 3% or less of a weight of the fiber based component remains affixed to the interior surface layer of the polymeric based liner.

* * * * *